350-394

OR 4,017,153

United States

Sardos

4,017,153

Apr. 12, 1977

[54] POLARIZATION ANALYZERS AND DUPLEXERS

[75] Inventor: René Sardos, Bordeaux, France

[73] Assignee: Agence Nationale de Valorisation de la Recherche (ANVAR), Neuilly sur Seine, France

[22] Filed: June 26, 1975

[21] Appl. No.: 590,841

Related U.S. Application Data

[63] Continuation-in-part of Ser. No. 469,766, May 14, 1974, abandoned.

[30] Foreign Application Priority Data

May 18, 1973   France .............................. 73.19248

[52] U.S. Cl. ................................ 350/152; 350/286
[51] Int. Cl.² .................... G02B 5/30; G02B 27/28; G02B 5/04
[58] Field of Search .......... 350/152, 159, 147, 185, 350/165, 286, 287

[56] References Cited

UNITED STATES PATENTS

| 2,129,669 | 9/1938 | Bowen | 333/21 R |
| 2,828,670 | 4/1958 | Luboshez | 350/185 |
| 3,422,273 | 1/1969 | Biernson | 350/286 |
| 3,622,225 | 11/1971 | Buchman et al. | 350/147 |

FOREIGN PATENTS OR APPLICATIONS

| 1,126,392 | 9/1968 | United Kingdom | 350/152 |

OTHER PUBLICATIONS

Houston, Jr.; J. B., "Optical Systems Manufacturing Technology", Optical Engineering, July–August 1974, pp. G160–G161.

*Primary Examiner*—John K. Corbin
*Assistant Examiner*—Wm. H. Punter
*Attorney, Agent, or Firm*—Arthur B. Colvin

[57] ABSTRACT

A polarization analyzer of the type comprising a non-absorbent or weakly absorbent body comprising a dielectric layer with two interfaces, one of which receives an incident wave produced by an external source and under an angle of incidence so that the reflected wave is perpendicular to the refracted wave, with at least one of the interfaces of the dielectric layer being provided with an anti-reflecting coating.

6 Claims, 7 Drawing Figures

POLARIZATION ANALYZERS AND DUPLEXERS

This application is a continuation-in-part of co-pending application Ser. No. 469,766, filed May 14, 1974, and now abandoned.

The present invention concerns a polarization analyzer or a duplexer, and more particularly a polarization analyzer for microwaves. The term duplexer as used herein, means a polarization analyzer supplying simultaneously two orthogonal components of an incident wave.

It is known that, in order to obtain a rectilinarly polarized reflected wave, a coupler with non-absorbent dielectric layers is used on which an incident wave falls under the Brewster angle, that is, the incident wave produces a reflected wave which is perpendicular to the wave refracted in the diopter. The Brewster angle $i_B$ is such that tan $$i_B = \frac{N_2}{N_1}.$$

where $N_2$ and $N_1$ are the absolute refractive indices of the media separated by the coupler.

The polarizers or analyzers utilizing the Brewster law comprise generally a coupler consisting of a single layer with parallel dielectric interfaces or of a pile of layers with parallel dielectric interfaces separated by a distance of a $\lambda/4$ where $\lambda$ is the wavelength of the used monochromatic light. However, these polarizers or analyzers have numerous inconveniences.

In fact, the elliptic incident wave comprises two perpendicular components. When this incident wave falls on one interface of a non-absorbent dielectric layer under the Brewster angle, there is a reflected wave which comprises practically only a rectilinear component perpendicular to the plane of incidence, that is, parallel to the interface, and an elliptic refracted wave which comprises the two components of the incident wave, one of them is a incidence plane while the other is perpendicular to said incidence plane. But when this refracted wave arrives on the second interface of the layer it plays the role of an incident wave for the said second interface, and a reflected wave is then produced and a refracted wave which issues from the said second interface. Due to this fact, multiple reflections are produced on the two interfaces inside the layer, and refracted waves which interfere between them and which can diminish the intensity of the reflected wave produced by the initial incident wave. To this we have to add the resonance phenomena in the dielectric layer or layers depending on whether the Brewster angle polarizer is composed of one or of several dielectric layers with parallel interfaces.

Finally it should be mentioned that all these polarizers or analyzers have a narrow band, that is, they are only used for very narrow frequency changes, since the thickness of the dielectric layer or the interval ($\lambda/4$) between the dielectric layers are related directly to the wavelength.

In order to eliminate these inconveniences, it has been suggested to use for microwaves grid analyzers or devices known under the name of "fin-line diplexers" or "turnstiles." But for mechanical reasons they cannot be realized in millimeter or submillimeter ranges where they present dimensional resonance varying with the power, which limits their accuracy.

The object of the present invention is to eliminate the above-mentioned inconveniences and to provide an analyzer or polarizer or duplexer which permits to analyze one of the two components of an incident wave, for example, an elliptic wave, by obtaining a reflected vibration, rectilinearly polarized, which has the greatest possible intensity and the least possible elliptic refracted vibration.

To this end the analyzer comprises a non-absorbent dielectric layer on which falls an elliptic wave produced by an external source, and under an angle of incidence so that the reflected wave is perpendicular to the wave refracted by the said dielectric layer, at least one of the interfaces of said dielectric layer being provided with an anti-reflecting coating.

Due to the matching of one of the interfaces of the dielectric layer by the anti-reflecting coating, multiple reflections and the phenomenon of interferences of the refracted wave are avoided.

According to another characteristic, the anti-reflecting coating is arranged on the interface receiving the incident wave, so that the refracted wave is transmitted almost in its entirety, and the reflected wave by the other interface of said dielectric layer comprises only a proportional part of the energy of the rectilinear component parallel to the diopter of the incident wave. The term diopter designates an interface between two media having different refractive indexes.

According to another characteristic, one of the interfaces of the dielectric layer is arranged perpendicularly to the wave refracted by the other interface, which permits to obtain an elliptic refracted wave which issues under a normal incidence and thus without change of polarization, hence the possibility of treating it with another analyzer in order to extract one of the desired components, for example, the component perpendicular to the rectilinear direction analyzed by the first analyzer.

According to another characteristic, the anti-reflecting coating is arranged on the input interface of the dielectric layer; this latter being preferably a prism with an input interface normal to the incident wave in order to avoid deformation of this wave at the entrace, a possible loss of energy being avoided by the anti-reflecting coating.

Other advantages and characteristics will result from reading the description given below by way of an indicative, but non-limiting example of the embodiments of the invention, as well as from the attached drawing.

Figure 1:
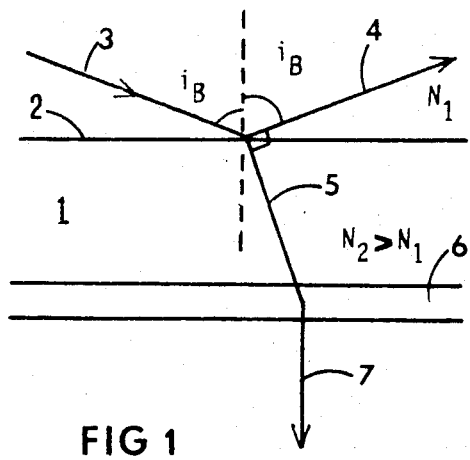
FIG. 1 is a schematic representation of an analyzer according to one embodiment of the invention.

The analyzer represented in FIG. 1 comprises a single dielectric layer with parallel interfaces whose upper interface 2 receives an elliptic incident wave 3 which can decompose into two perpendicular vibrations, one of which is rectilinear and parallel to the upper interface 2. This incident wave 3 which falls on the upper interface 2 under the Brewster angle $i_B$, produces a reflected wave 4 and a refracted wave 5.

The downwardly interface 6 of the dielectric layer is adapted, that is, it is provided with an anti-reflecting coating so that the refracted wave 5 produces an exit wave 7 of the same nature, and whose components are very slightly dephased. This matching of the downwardly interface 6 permits to eliminate the majority of the multiple reflections.

Figure 2:
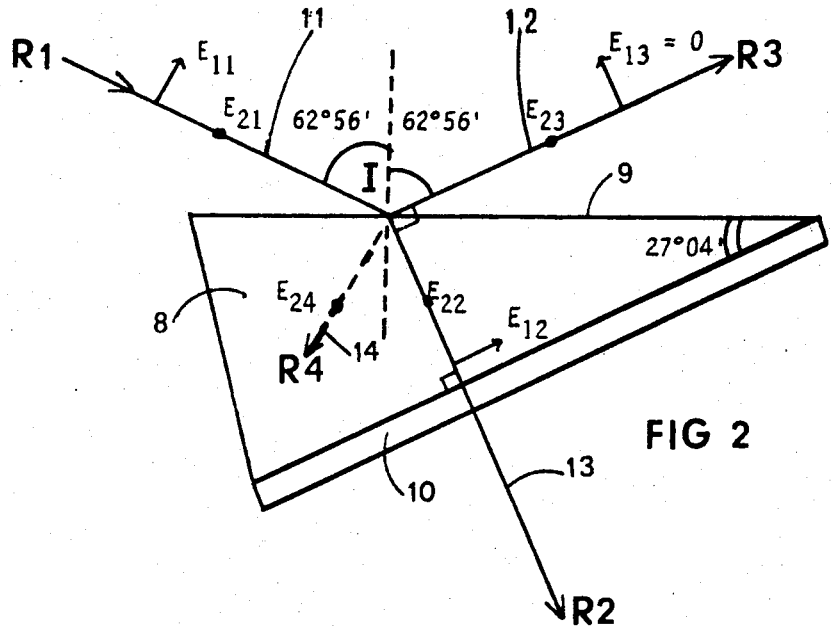
FIG. 2 is a schematic representation according to another embodiment of the invention.

According to another embodiment represented in FIG. 2, the analyzer comprises a prism 8 with the refractive index $N_2=1.9573$ and the coefficient of reflection 0.35 according to the formula $$\frac{N_2^2 - N_1^2}{N_2^2 + N_1^2}$$

whose exit interface 10 is matched and arranged preferably normal to the refracted wave 13.

Let us now consider an elliptic wave 11, polarized at 45 degrees of the plane of incidence, which propagates along the direction R1 and forms with the normal in I to the entrance interface 9 the Brewster angle $i_B$ which is 62° 56' in the selected example. Taking into account the fact that in this case $N_2/N_1$ is greater than 1, the angle of the prism is $\pi/2 - i_B$ or 27° 04'.

The incident wave 11 comprises the components $E-_{21}$, parallel to the plane dielectric interface 9, and $E-_{11}$ perpendicular to $E-_{21}$. The wave reflected in I also forms an angle of 62°. 56' with the normal in I at the plane entrance interface anh has a single component $E-_{23}$ whose energy is equal to about ⅓ of $E-_{21}$, which component $E-_{23}$ is rectilinear and perpendicular to the plane of incidence, the energy and the amplitude of the component $E-_{13}$ being zero.

The refracted wave 13 propagates along the direction R2 perpendicularly to the direction R3 of the reflected wave 12. This refracted wave 13 comprises two components $E-_{22}$ and $E-_{12}$ whose energies are respectively equal to about ⅔ of $E-_{21}$ and $E-_{11}$.

When the exit interface 10, normal to the direction R2, is perfectly matched, the refracted wave leaves completely from the prism. When this interface is poorly matched, we find that neither the polarization nor the intensity of the reflected wave 12 are modified. In fact, if there is a partial reflection of the refracted wave 13 on the exit interface 10, a part of the energy returns and arrives at I on the entrance interface 9 under the Brewster incidence. The elliptic refracted wave due to this partial reflection returns to the source, and the reflected wave polarized along $E-_{24}$ continues its propagation in the direction R4, the said component $E-_{24}$ being easily eliminated.

If the source reflects partially, which is current in microwaves, one needs but take a dielectric layer of an angle slightly different to $\pi/2 - i_B$; then the refracted wave $R_2$ or 13 reaches the downwardly interface by forming a small angle with the normal and the reflected wave. The refracted wave does not return in direction of R1, but returns in a different direction and it is easy to eliminate it.

Several measurements were made by means of a prism with a summit angle equal to 27° 04', a height of 25 mm between its summit and basis, an absolute refractive index $N = 1.9573$ and made of a material with a Brewster reflection factor of the order of 0.35. For a radiation of 5.461 ang. mercury, we found that the ratio of amplitudes $$\frac{b}{a} = \frac{E_{13}}{E_{23}}$$

of the vibration propagating along R3 is less than 1/1000, where b and a are the axes of the ellipse made by the components $E_{13}$ and $E_{23}$ because the wave 11 is an elliptic wave.

For the radiations 4.358 ande 4.047 ang., with the indices of 2.0100 and 2.0377 resp., we measured that the reflected component $E-_{23}$ is always polarized rectilinearly, and that the ratio b/a is always less than 1/1000.

Likewise, always with the prism defined above, the experiments made in the infrared region with wavelengths of $1.129\mu$ and $1.530\mu$, for which the indices are respectively 1.8995 and 1.8896, showed that the component $E_{23}$ reflected along the direction R3 is rectilinear.

We find thus that the analyzer has a wide band which is a function of the material used and of the matching made; in practice, a material with a relative high relative refraction index and a matching for the provided frequency band is selected to obtain the maximum of transmitted energy and the maximum of reflected energy.

Figure 3:
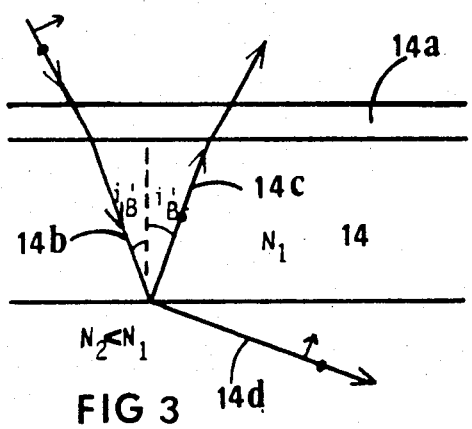
FIGS. 3, 4 and 5 are schematic representations according to other embodiments.
Figure 4:
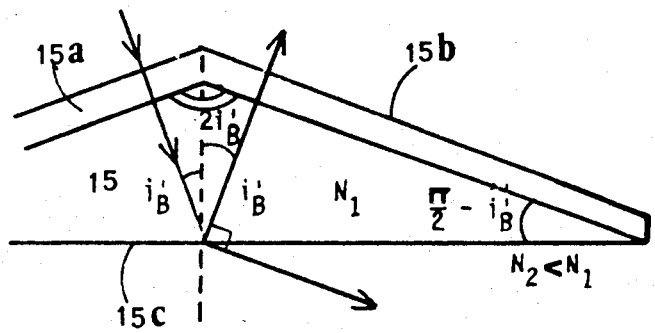

According to other embodiments represented in FIGS. 3 and 4, used in the case where $N_2/N_1$ is less than 1, it is the upper entrance interface 14a which is matched when the analyzer consists of a single dielectric layer with parallel interface 14, the incident wave 14b in the dielectric layer falling under the Brewster incidence $i'_B$ and giving rise to a reflected wave 14c which comprises only the energy and the component parallel to the interface and an elliptic refracted wave 14d comprising the two components and constituting the exit wave.

In the case where $N_2/N_1$ is less than 1, we can also obtain an analyzer consisting of a prism or a portion of a prism 15 whose angle is then $- 2 i'_B$ and whose two entrance interfaces 15a and 15b are adapted, the Brewster incidence being formed on the base 15c.

Measurements made by means of such a prism with a summit angle of 124° 14' and for the radiation $1.53\mu$ (N = 1.8896), showed that the reflected component is practically rectilinear with a ratio of the axes b/a less than 1/1000. This result is also observed for the radiation $1.129\mu$.

Figure 5:
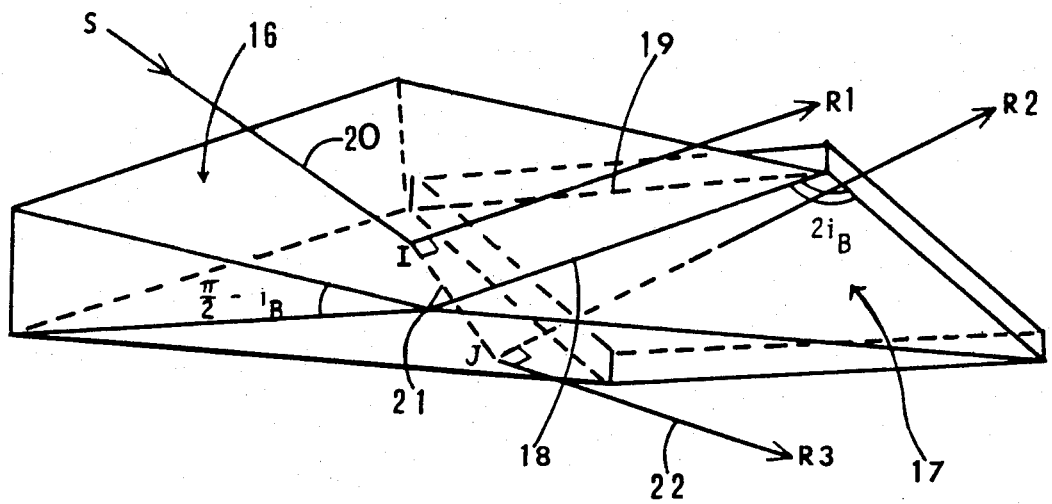

The analyzers described above show that it is possible to extract from an elliptic wave a rectilinear component, the refracted wave being elliptic. In order to obtain a rectilinear wave along a direction orthogonal to the preceding one, which permits to make a complete analysis of the elliptic incident wave, we connect to the prism of FIG. 2, for example, a second prism whose exit interface is matched but whose edge is orthogonal to the edge of the first prism. Instead of using an arrangement consisting of the connection of two prisms similar to that in FIG. 2, a device is preferably used, as represented in FIG. 5, which consists of two prisms 16 and 17 with summit angles of 27° 04' and 125° 52' respectively, one face of each of the said prisms being connected so that their edges $16_1$ and $17_2$ are perpendicular. It does without saying that this analyzer consists with advantage of a conveniently cut prism. In the case of gluing, a glue is obviously selected which has the same refractive index. In both bases we find that only one face has to be matched.

The embodiment shown in FIG. 5 is formed by cutting a block of suitable material to the form shown. Thus, two prisms 16 and 17 will be formed. When assembled as shown in FIG. 5, the edge $16_1$ will overlie the edge $17_1$; the edge $16_2$ will overlie the edge $17_2$ and the edge $16_3$ will overlie the edge $17_3$; the edge $16_1$ being perpendicular to the edge $17_2$. The advantage of this arrangement is its compactness.

In fact, to an incident wave polarized at 45° of the plane of incidence correspond two reflected waves propagating along the directions R1 and R2, the wave reflected along R2 being due to the refracted wave 21 playing the role of an incident wave for the prism 17, while the wave 22 refracted by the base of the said prism 17 issues from the block along the direction R3.

For the radiation 5.461 ang. we observed that the components along the directions R1 and R2 are polarized rectilinearly along two orthogonal directions and have each a ratio b/a less than 1/1000. The measurements in the infrared, and particularly for the radiation 1.53μ, verified the preceding results.

It is thus possible to make a complete analysis of the elliptic incident wave in the infrared, in the visible, as well as in the ultra-violet; then we can determine experimentally the phase relation and the coefficient of proportionality between the energy transmitted along the direction R1 and R2 and the incident energy in the corresponding azimuth.

In the range of the microwaves we verified in a similar manner that the reflection factor varies according to the refractive index of the material or of its dielectric constant ε (epsilon), and that under the Brewster incidence the reflected vibration is polarized rectilinearly. Since the choice of material with a high refractive index or a high dielectric constant is wide, we can have very great reflection factors, which increases the luminosity of the analyzer. In a diffused material by the firm "Lignes Telephoniques et Telegraphiques: L.T.T.," whose dielectric constant (epsilon) ε = 9, with an absolute refracted index N = 3 and tan (delta) δ = 2.10⁻³, (delta) δ= los angle, we realized a prism similar to that of FIG. 2 having a Brewster reflection factor of 0.64, the summit angle being 18°. The downwardly interface 10 was matched with a dielectric layer of thickness equal to λ/4 and those with a dielectric constant (epsilon) ε = 3 for a frequency of 70 GHz. A measurement made in the open air with such a prism permits us to obtain for an incident wave polarized at 45° a reflected wave so that b/a = 1/16, and an elliptic refracted wave which is much greater than that obtained with the analyzers of the prior art.

In order to avoid difficulties of propagation in the open air, it is desirable, particularly in the millimeter range, to use over-dimensioned wave guides, which are known in themselves.

Figure 6:
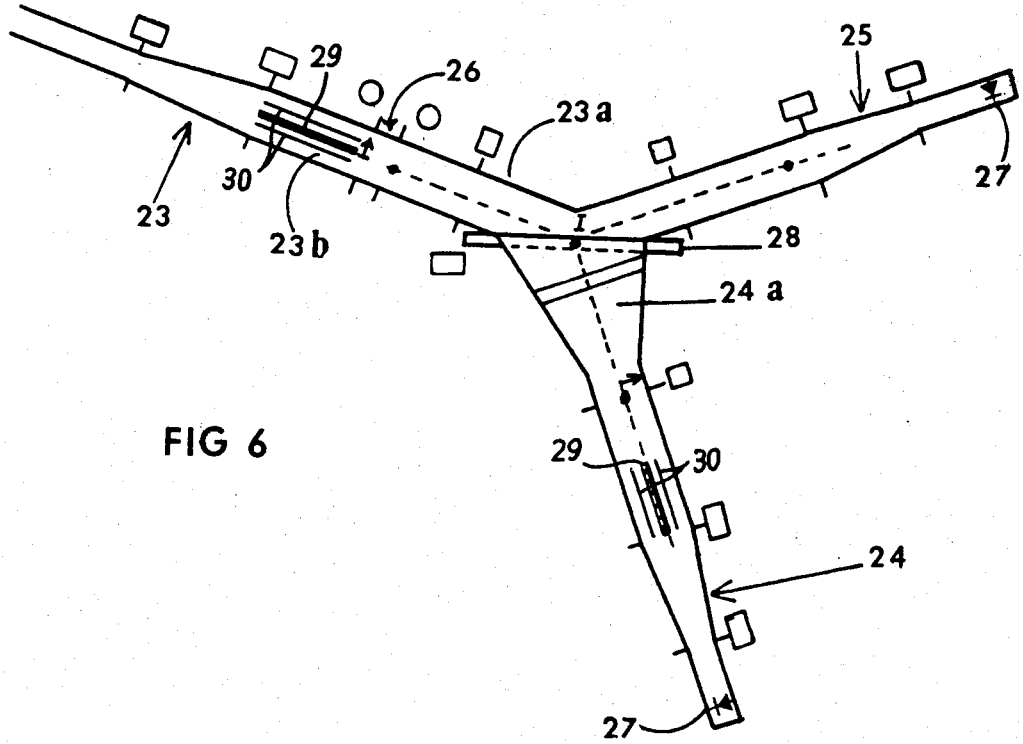
FIG. 6 shows a schematic cross-section view of the analyzer according to FIG. 2 incorporated in overdimensioned wave guides.
Figure 5A:
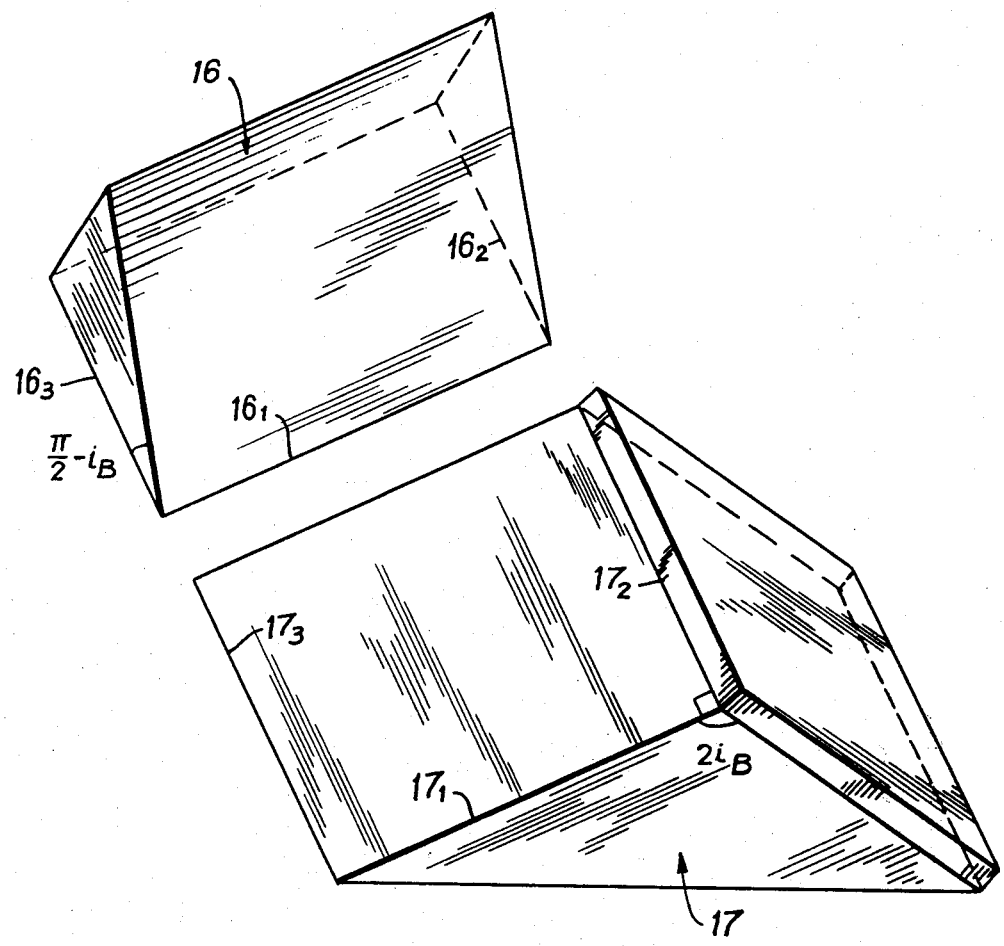
FIG. 5a is an exploded view showing the embodiment of FIG. 5 prior to assembly.

FIG. 5 shows a polarization diplexer giving the both orthogonally components of an incident elliptic wave while FIG. 6 shows in cross section a complete analyzer comprising the over-dimensioned wave guides connected to the analyzing element proper, and consisting of a prism of the type shown in FIG. 2, where $N_2/N_1$ is greater than 1, it is understood that a similar assembly can be realized for example, for the prism of FIG. 4 which corresponds to $N_2/N_1$ less than 1.

The analyzer comprises three arms 23 to 25 serving as guides respectively for the incident wave, the reflected wave and the refracted wave. The wave guides are rectangular or square in cross-section possibly with circular passages, the nature of these guides being represented in FIG. 6 by rectangles, square or circles. In the arm 23 is provided a transition form standard rectangular to over-dimensioned rectangular guides; in the band under consideration, the standard rectangular guide only permits the propagation of the wave polarized perpendicularly to the large side of the guide. In an experimental purpose, between the over-dimensioned rectangular guide and the square guide 23a is interposed a circular guide 23b provided with a rotating joint 26, in which are arranged a polarization plate consisting of a mica plate 29 coated with a conductive coat deposited under a vacuum, and one or two mode filter 30 whose function it is respectively to absorb the undesired component of an elliptic wave, if any, and to avoid the creation of parasite modes.

This entire part of the arm 23 arranged in front of the square guide is not indispensable, and it has only been realized in order to obtain a rectilinearly polarized vibration to test the analyzer proper.

The arms 24 and 26 consist of square and rectangular guides with insertion of polarization plates and a mode filter similar to those of the arm 23, and they comprise each at their exit end a detector 27 consisting of a diode detector or bolometer.

The arm 24 comprises a transition guide 24a in which is arranged a prism provided with its matched interface.

The arms 23 to 25 are so arranged that the incident wave falls at I under the Brewster angle, and they are provided with flanges 28 permitting the disassembly to put the measuring prism in place.

It goes without saying that all wave guides can consist of circular guides or a juxtaposition of circular, square and rectangular guides judiciously selected.

Assuming that the overdimensioned guides are square, the non-absorbent dielectric layer, such as the prism represented in FIG. 2, is placed in a rectangular-square transituion.

The analyzer described with reference to FIG. 6 is destined to receive a non-absorbent dielectric layer, such as the prism of FIG. 2. As far as the prism represented in FIG. 4 is concerned, the said prism is placed in a square or circular guide junction, the angles being judiciously selected.

We see thus that, thanks to the invention, it is possible to realize polarization analyzers which can be used in over-dimensioned guides for microwaves both in the open air and in which analyzers comprise only a single matched interface.

In the foregoing consideration the matching was effected by means of an anti-reflecting coating or the addition of a dielectric layer having a thickness equal to λ 4 or any other suitable means, such as a progressive variation of the dielectric constant or a stacking of dielectric layers having each a thickness equal to λ/4, as a function of the frequency band in question and of the nature of the material of the dielectric layer.

It is understood that the present invention is not limited to the embodiments described above, but covers on the contrary all variants. Likewise, the application in the millimeter, submillimeter, and infrared range can be extended to polarimetric analysis in plasmas, which require precision analyzers which are sensitive in the infrared and submillimeter range.

Having thus described my invention, what I claim as new and desire to secure by Letters Patent of the United States is:

1. A polarization analyzer comprising a first substantially non-absorbent dielectric prismatic layer defining, at one side, a first interface, and at the other side a second interface, said second interface determining with said first interface a summit angle of $\pi/2 - iB$, $iB$ being the Brewsterian angle value for a reflection against a diopter whose first medium is the medium surrounding said layer and second medium is the dielectric of the layer, a second substantially non-absorbent dielectric prismatic layer defining, at one side, a first interface and at the other side, a second and a third side disposed symmetrically to opposite sides of a plane perpendicular to said first interface so as to determine with said first interface two opposite angles equal to $\pi/2 - i'B$ and a summit angle of $2i'B$, $i'B$ being the Brewsterian angle value for a reflection against a diopter whose first medium is the dielectric of the layer and second medium is that surrounding said layer, said layers having the same refractive index, and means for directing an incident wave at the angle $iB$ against the first interface of the first layer, said layers being so joined that the second interface of the first layer is applied directly to the third interface of the second layer, the edge of the summit angle of said second layer being orthogonal with the edge of the summit angle of said first layer.

2. Polarization analyzer according to claim 1, characterized in that the incident wave propagates in an over-dimensioned guide.

3. Polarization analyzer according to claim 1, characterized in that the reflected wave propagates in a guide on the one hand, comprising guide transitions in at least one of which are arranged at least one polarization plate and one mode filter and, on the other hand, terminating in a standard rectangular guide and a detector.

4. Polarization analyzer according to claim 1, characterized in that the refracted wave propagates in a guide, on the one hand, comprising guide transitions, in at least one of which are arranged a polarization plate and a mode filter, and on the other hand, terminating in a standard rectangular guide and a detector, and that the non-absorbent dielectric layer is arranged in a rectangular-square or elliptic-circular transition.

5. A polarization analyzer according to claim 1 wherein said second interface is provided with an anti-reflecting coating.

6. A polarization analyzer according to claim 1, wherein at least one of said second and third interfaces is provided with an anti-reflecting coating.

* * * * *